US012768370B2

(12) United States Patent
Muraoka et al.

(10) Patent No.: US 12,768,370 B2

(45) Date of Patent: Oct. 20, 2026

(54) HYDRAULIC DRIVE DEVICE

(71) Applicant: KAWASAKI JUKOGYO KABUSHIKI KAISHA, Kobe (JP)

(72) Inventors: Hideyasu Muraoka, Kobe (JP); Nobuyuki Kinoshita, Kobe (JP); Yoji Yudate, Kobe (JP); Yoshihiko Hata, Kobe (JP); Yuki Kuwabara, Kobe (JP); Yuichi Miyagi, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

(21) Appl. No.: 18/876,581

(22) PCT Filed: May 23, 2023

(86) PCT No.: PCT/JP2023/019117

§ 371 (c)(1), (2) Date: Dec. 18, 2024

(87) PCT Pub. No.: WO2023/248680

PCT Pub. Date: Dec. 28, 2023

(65) Prior Publication Data

US 2025/0376993 A1 Dec. 11, 2025

(30) Foreign Application Priority Data

Jun. 23, 2022 (JP) ................................ 2022-101449

(51) Int. Cl.
*F15B 11/024* (2006.01)

(52) U.S. Cl.
CPC ....................... *F15B 11/024* (2013.01); *F15B 2211/20515* (2013.01); *F15B 2211/3058* (2013.01);
(Continued)

(58) Field of Classification Search
CPC .................... F15B 11/024; F15B 21/14; F15B 2211/20561; F15B 2211/20515; F15B 2211/3058; F15B 2211/50536
See application file for complete search history.

(56) References Cited

U.S. PATENT DOCUMENTS 9,512,596 B2 12/2016 Kang et al.
9,845,814 B2 * 12/2017 Akiyama ............ F15B 11/0445
(Continued)

FOREIGN PATENT DOCUMENTS

JP 2004138187 A 5/2004
JP 2008157407 A * 7/2008
(Continued)

*Primary Examiner* — Thomas E Lazo

(74) *Attorney, Agent, or Firm* — Alleman Hall LLP

(57) ABSTRACT

This hydraulic drive device supplies a working fluid to a hydraulic cylinder including a head-end port and a rod-end port and includes: a hydraulic pump motor including a suction port and a discharge port; an electric motor connected to the hydraulic pump motor; a directional control valve that switches a connection target of the head-end port between the discharge port and the suction port; a regeneration valve that opens and closes a regeneration passage connecting the head-end port and the rod-end port; and an unloader valve that connects, to a tank, a discharge passage connecting the discharge port and the directional control valve.

7 Claims, 4 Drawing Sheets

(52) U.S. Cl.
CPC .................. *F15B 2211/327* (2013.01); *F15B 2211/50536* (2013.01); *F15B 2211/526* (2013.01); *F15B 2211/6306* (2013.01); *F15B 2211/6343* (2013.01); *F15B 2211/862* (2013.01); *F15B 2211/865* (2013.01)

(56) References Cited

U.S. PATENT DOCUMENTS

| | | | | |
|---|---|---|---|---|
| 2009/0287373 | A1* | 11/2009 | Vigholm ............... | E02F 9/2292<br>700/282 |
| 2013/0098463 | A1* | 4/2013 | Kuehn .................. | E02F 9/2242<br>137/12 |
| 2019/0352884 | A1* | 11/2019 | Kai ....................... | F15B 11/024 |
| 2022/0252088 | A1* | 8/2022 | Vacca ................... | F15B 11/024 |
| 2023/0228063 | A1 | 7/2023 | Kondo et al. | |

FOREIGN PATENT DOCUMENTS

| | | | | |
|---|---|---|---|---|
| JP | 2011149473 | A | * | 8/2011 |
| JP | 2021181789 | A | | 11/2021 |

* cited by examiner

HYDRAULIC DRIVE DEVICE

TECHNICAL FIELD

The present disclosure relates to a hydraulic drive device that supplies and drains a working fluid to a hydraulic cylinder including a head-end port and a rod-end port.

BACKGROUND ART

For example, a hydraulic drive device such as that disclosed in Patent Literature (PTL) 1 is known as a hydraulic drive device that drives a hydraulic cylinder. In the hydraulic drive device such as that disclosed in PTL 1, a hydraulic pump motor is rotatably driven by working oil drained from a head-end port of a boom cylinder in a boom lowering operation. Thus, the potential energy of a boom can be regenerated as electrical energy.

CITATION LIST

Patent Literature

PTL 1: Japanese Laid-Open Patent Application Publication No. 2021-181789

SUMMARY OF INVENTION

Technical Problem

With the hydraulic drive device disclosed in PTL 1, it is possible to reduce energy consumption by regenerating the fluid energy of the working fluid as electrical energy. However, there is a demand for improved operability in addition to improved energy consumption in the hydraulic drive device disclosed in PTL 1.

Thus, an object of the present disclosure is to provide a hydraulic drive device that has improved operability while consuming less energy.

Solution to Problem

A hydraulic drive device according to the present disclosure supplies a working fluid to a hydraulic cylinder including a head-end port and a rod-end port and includes: a hydraulic pump motor including a suction port and a discharge port; an electric motor connected to the hydraulic pump motor; a directional control valve that switches a connection target of the head-end port between the discharge port and the suction port; a regeneration valve that opens and closes a regeneration passage connecting the head-end port and the rod-end port; and an unloader valve that connects, to a tank, a discharge passage connecting the discharge port and the directional control valve.

According to the present disclosure, the directional control valve connects the head-end port and the suction port, and the unloader valve connects the discharge passage and the tank. Therefore, when the hydraulic cylinder is retracted, the working fluid is pushed out through the head-end port and supplied to the suction port of the hydraulic pump motor. With this, the electric motor can be driven via the hydraulic pump motor, meaning that energy can be regenerated using the electric motor. Thus, the energy consumption in the hydraulic drive device can be reduced.

Furthermore, according to the present disclosure, the regeneration valve opens and closes the regeneration passage connecting the head-end port and the rod-end port. The regeneration valve is opened when the working fluid is pushed out through the head-end port, and thus part of the working fluid pushed out is regenerated to the rod-end port. Thus, the working fluid can be quickly supplied to the rod-end port, allowing for improved operability.

Advantageous Effects of Invention

According to the present disclosure, it is possible to reduce the size of the hydraulic drive device while reducing energy consumption thereof.

The above object, other objects, features, and advantages of the present invention will be made clear by the following detailed explanation of preferred embodiments with reference to the attached drawings.

DESCRIPTION OF EMBODIMENTS

Hereinafter, hydraulic drive devices 1, 1A according to Embodiments 1 and 2 of the present disclosure will be described with reference to the aforementioned drawings. Note that the concept of directions mentioned in the following description is used for the sake of explanation; the orientations, etc., of elements according to the invention are not limited to these directions. Each of the hydraulic drive devices 1, 1A described below is merely one embodiment of the present disclosure. Thus, the present disclosure is not limited to the embodiments and may be subject to addition, deletion, and alteration within the scope of the essence of the invention.

Embodiment 1

Figure 1:
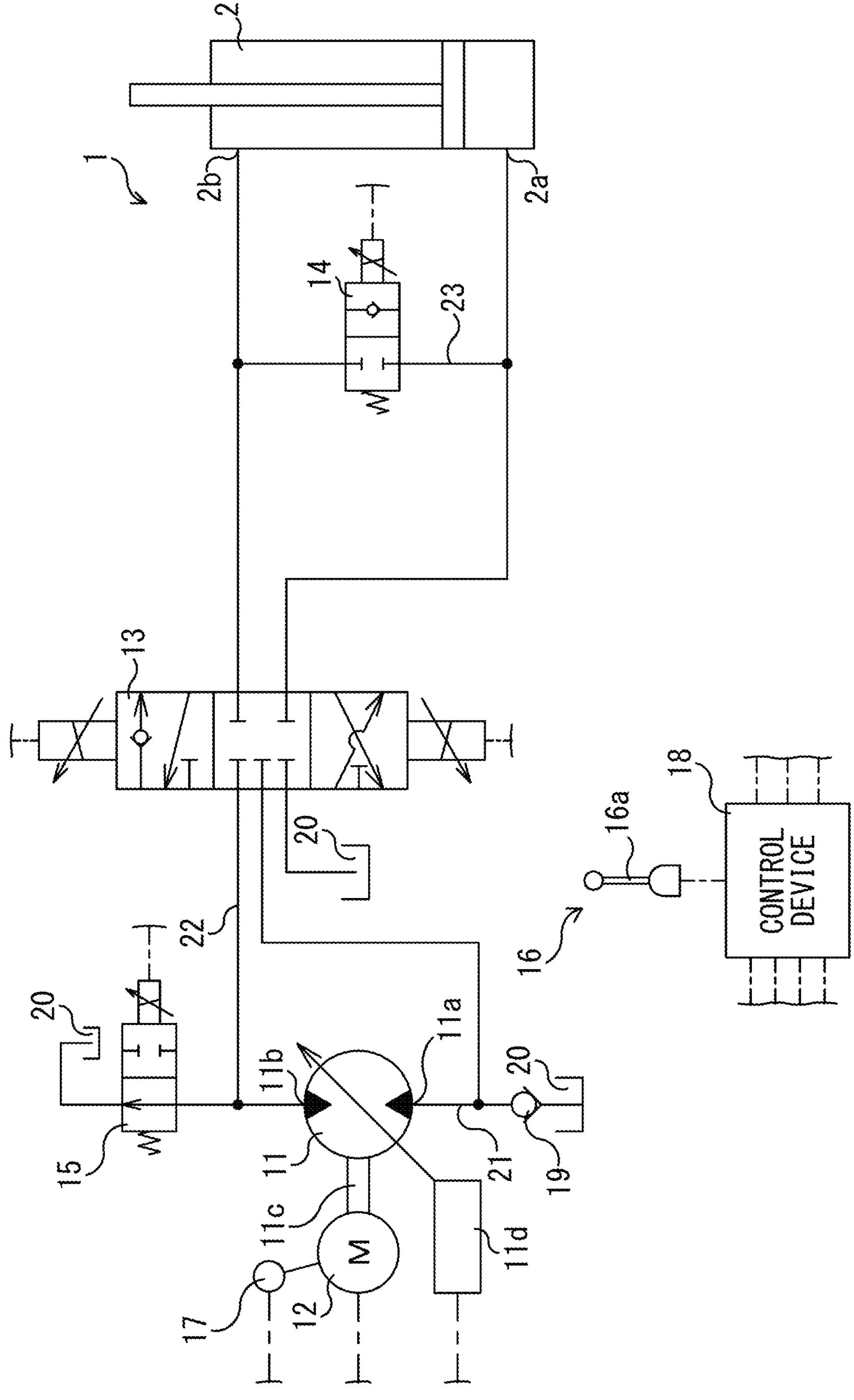
FIG. 1 is a circuit diagram illustrating the configuration of a hydraulic drive device according to Embodiment 1 of the present disclosure.

The hydraulic drive device 1 illustrated in FIG. 1 is included, for example, in a work vehicle (not illustrated in the drawings). Examples of the work vehicle include construction vehicles such as hydraulic excavators and hydraulic cranes and industrial vehicles such as forklifts. In the present embodiment, the work vehicle is a hydraulic excavator. The hydraulic excavator includes a boom, an arm, and an attachment (for example, a bucket). The hydraulic excavator can perform various tasks by moving the boom, the arm, and the attachment (for example, the bucket). The hydraulic excavator includes a boom cylinder 2.

The boom cylinder 2, which is one example of the hydraulic cylinder, includes a head-end port 2*a* and a rod-end port 2*b*. The boom cylinder 2 is provided on the boom. The boom cylinder 2 is extended and retracted to move the boom. More specifically, the boom cylinder 2 is extended when the working fluid (for example, liquid such as oil or water) is supplied to the head-end port 2*a* and drained from the rod-end port 2*b*. As a result, the boom moves upward. On the other hand, the boom cylinder 2 is retracted when the working fluid is drained from the head-end port 2*a* and supplied to the rod-end port 2*b*. As a result, the boom moves downward. Note that the boom cylinder 2 is under the empty weight of the boom in a retracting direction in the present embodiment. Therefore, the boom cylinder 2 under the empty weight of the boom causes the working fluid to be drained from the head-end port 2*a* and draws in the working fluid through the rod-end port 2*b*; thus, the boom cylinder 2 is retracted.

<Hydraulic Drive Device>

The hydraulic drive device 1 supplies and drains the working fluid to and from the boom cylinder 2. Thus, the hydraulic drive device 1 drives the boom cylinder 2. More specifically, the hydraulic drive device 1 supplies and drains the working fluid to and from each of the head-end port 2*a* and the rod-end port 2*b*. Thus, the hydraulic drive device 1 extends and retracts the boom cylinder 2. Furthermore, the hydraulic drive device 1 regenerates energy using the working fluid that is drained from the head-end port 2*a* of the boom cylinder 2. The hydraulic drive device 1 that functions as just described includes a hydraulic pump motor 11, an electric motor 12, a directional control valve 13, a regeneration valve 14, and an unloader valve 15. Furthermore, the hydraulic drive device 1 includes an operation device 16, a temperature sensor 17, and a control device 18.

<Hydraulic Pump Motor>

The hydraulic pump motor 11 includes a suction port 11*a* and a discharge port 11*b*. The hydraulic pump motor 11 further includes a shaft 11*c*. The suction port 11*a* is connected to a tank 20 via a suction passage 21. Note that a check valve 19 is interposed in the suction passage 21. The check valve 19 allows the flow of the working fluid from the tank 20 to the suction port 11*a* and blocks the opposite flow of the working fluid.

When the shaft 11*c* is rotatably driven, the hydraulic pump motor 11 operates as follows. Specifically, the hydraulic pump motor 11 draws in the working fluid through the suction port 11*a*. Furthermore, the first hydraulic pump motor 11 discharges the working fluid from the discharge port 11*b*. On the other hand, when the working fluid is supplied to the suction port 11*a*, the hydraulic pump motor 11 causes rotation of the shaft 11*c*. Subsequently, the hydraulic pump motor 11 drains the working fluid from the discharge port 11*b*. In the present embodiment, the hydraulic pump motor 11, which is a swash plate pump of the variable capacity type, includes a regulator 11*d*. The regulator 11*d* changes the tilt angle of the swash plate on the basis of a capacity command that is input to the regulator 11*d*. As a result, the piston capacity of the hydraulic pump motor 11 changes. This means that the hydraulic pump motor 11 can change a discharge flow rate and a suction flow rate.

<Electric Motor>

The electric motor 12 is connected to the hydraulic pump motor 11. More specifically, the electric motor 12 is coupled to the shaft 11*c*. The electric motor 12 rotatably drives the hydraulic pump motor 11 to discharge the working fluid from the hydraulic pump motor 11. More specifically, the electric motor 12 rotatably drives the shaft 11*c* to discharge the working fluid from the discharge port 11*b*. Furthermore, the electric motor 12 generates electric power by rotation of the hydraulic pump motor 11 (more specifically, the shaft 11*c*) when supplied with the working fluid. In other words, the electric motor 12 works with the hydraulic pump motor 11 to regenerate the fluid energy of the working fluid as electrical energy. Moreover, the electric motor 12 changes the rotational speed (more specifically, the rotational speed of the shaft 11*c*) according to a rotational speed command that is input to the electric motor 12.

<Directional Control Valve>

The directional control valve 13 is connected to each of the suction port 11*a* and the discharge port 11*b* of the hydraulic pump motor 11. More specifically, the directional control valve 13 is connected on the side of the suction port 11*a* of the hydraulic pump motor 11 with respect to the check valve 19 in the suction passage 21. Furthermore, the directional control valve 13 is connected to the discharge port 11*b* via a discharge passage 22. The directional control valve 13 is connected to the head-end port 2*a* of the boom cylinder 2. Furthermore, the directional control valve 13 is connected to the rod-end port 2*b* of the boom cylinder 2 and the tank 20.

The directional control valve 13 switches the connection target of the head-end port 2*a* between the discharge port 11*b* and the suction port 11*a* according to an operation command that is input to the directional control valve 13. Furthermore, when connecting the head-end port 2*a* to the discharge port 11*b*, the directional control valve 13 connects the rod-end port 2*b* to the tank 20. On the other hand, when connecting the head-end port 2*a* to the suction port 11*a*, the directional control valve 13 connects the rod-end port 2*b* to the discharge port 11*b*. Note that when connecting the rod-end port 2*b* to the discharge port 11*b*, the directional control valve 13 allows the flow of the working fluid from the discharge port 11*b* to the rod-end port 2*b* and blocks the opposite flow of the working fluid. Furthermore, when connecting the head-end port 2*a* to the suction port 11*a*, the directional control valve 13 controls the opening degree between the head-end port 2*a* and the suction port 11*a* (hereinafter also referred to as "the opening degree of the directional control valve 13") according to the operation command. In the present embodiment, the directional control valve 13 is an electric spool valve. Note that the directional control valve 13 is not limited to the electric spool valve.

<Regeneration Valve>

The regeneration valve 14 opens and closes a regeneration passage 23 connecting the head-end port 2*a* and the rod-end port 2*b*. The regeneration valve 14 is interposed in the regeneration passage 23. The regeneration valve 14 opens and closes the regeneration passage 23 according to a regeneration command. Furthermore, with the regeneration passage 23 open, the regeneration valve 14 allows the flow of the working fluid in a regeneration direction and blocks the opposite flow of the working fluid. The regeneration direction refers to the direction of the flow from the head-end port 2*a* to the rod-end port 2*b*. Thus, the second regeneration valve 14 regenerates, to the rod-end port 2*b*, the working fluid drained from the head-end port 2*a*. The regeneration valve 14 reduces the opening degree according to the regeneration command. The regeneration valve 14 is an electromagnetic proportional control valve, for example.

<Unloader Valve>

The unloader valve 15 connects, to the tank 20, the discharge passage 22 connecting the discharge port 11*b* and the directional control valve 13. More specifically, the unloader valve 15 connects the discharge passage 22 to the tank 20 according to an unloading command that is input to the unloader valve 15. Thus, the hydraulic pump motor 11 can be unloaded. In the present embodiment, the unloader valve 15 is a solenoid on-off valve. Note that the unloader valve 15 may be an electromagnetic proportional control valve having a controllable opening degree.

<Operation Device>

The operation device 16 is for operating the boom (more specifically, the boom cylinder 2). The operation device 16 includes an operation lever 16*a*. The operation lever 16*a* is configured to be operable. The operation device 16 outputs an operation signal corresponding to an operation direction and an operation amount of the operation lever 16*a*. The operation device 16 is an electric joystick, for example. Note that the operation device 16 may be a pilot operation valve. In this case, the operation device 16 outputs an operation signal corresponding to the output pressure of the pilot operation valve. Alternatively, the operation device 16 may be a touch panel. In this case, the operation device 16 outputs an operation signal according to an operation that is input thereto, a program, or the like.

<Temperature Sensor>

The temperature sensor 17 measures the coil temperature of the electric motor 12. More specifically, the temperature sensor 17 directly or indirectly measures the coil temperature of the electric motor 12. In the present embodiment, the temperature sensor 17 is provided on the casing of the electric motor 12. The temperature sensor 17 indirectly measures the coil temperature by measuring the temperature of the casing of the electric motor 12. Furthermore, the temperature sensor 17 outputs the measured temperature of the casing of the electric motor 12.

<Control Device>

The control device 18 controls the operation of each of the directional control valve 13, the regeneration valve 14, and the unloader valve 15 according to the operation signal that is input to the control device 18. More specifically, the control device 18 outputs the operation command, the regeneration command, and the unloading command each of which corresponds to the operation signal, thereby controlling the operations of the directional control valve 13, the regeneration valve 14, and the unloader valve 15. Thus, the control device 18 controls the flow of the working fluid in the hydraulic drive device 1. Furthermore, the control device 18 controls the operation of each of the hydraulic pump motor 11 and the electric motor 12 according to the operation signal. More specifically, the control device 18 outputs the capacity command and the rotational speed command each of which corresponds to the operation signal, thereby controlling the operations of the hydraulic pump motor 11 and the electric motor 12. Thus, the control device 18 controls the discharge flow rate and the suction flow rate at the hydraulic pump motor 11. Furthermore, the control device 18 controls the operation of each of the directional control valve 13 and the regeneration valve 14 on the basis of the coil temperature measured by the temperature sensor 17. More specifically, the control device 18 controls the opening degree of each of the directional control valve 13 and the regeneration valve 14 on the basis of the coil temperature measured by the temperature sensor 17.

<Operation of Hydraulic Drive Device>

In the hydraulic drive device 1, when the operation device 16 is operated (in the present embodiment, when the operation lever 16*a* is operated), the operation device 16 outputs the operation signal. The control device 18 controls the operation of each of the directional control valve 13, the regeneration valve 14, and the unloader valve 15 according to the operation signal. Furthermore, the control device 18 controls the operation of each of the electric motor 12 and the hydraulic pump motor 11 according to the operation signal. Thus, the control device 18 extends and retracts the boom cylinder 2 in a direction and at a speed that correspond to the operation signal (in the present embodiment, the operation direction and the operation amount of the operation lever 16*a*). In the hydraulic drive device 1, when lowering the boom (in other words, when retracting the boom cylinder 2), part of the working fluid drained from the head-end port 2*a* of the boom cylinder 2 is regenerated to the rod-end port 2*b* of the boom cylinder 2. Furthermore, in the hydraulic drive device 1, the remaining part of the working fluid drained from the head-end port 2*a* is used for energy regeneration. Moreover, the control device 18 controls the opening degree of each of the directional control valve 13 and the regeneration valve 14 on the basis of the coil temperature of the electric motor 12. This prevents an excessive increase in the coil temperature of the electric motor 12.

[Operation to Extend Boom Cylinder]

Figure 2:
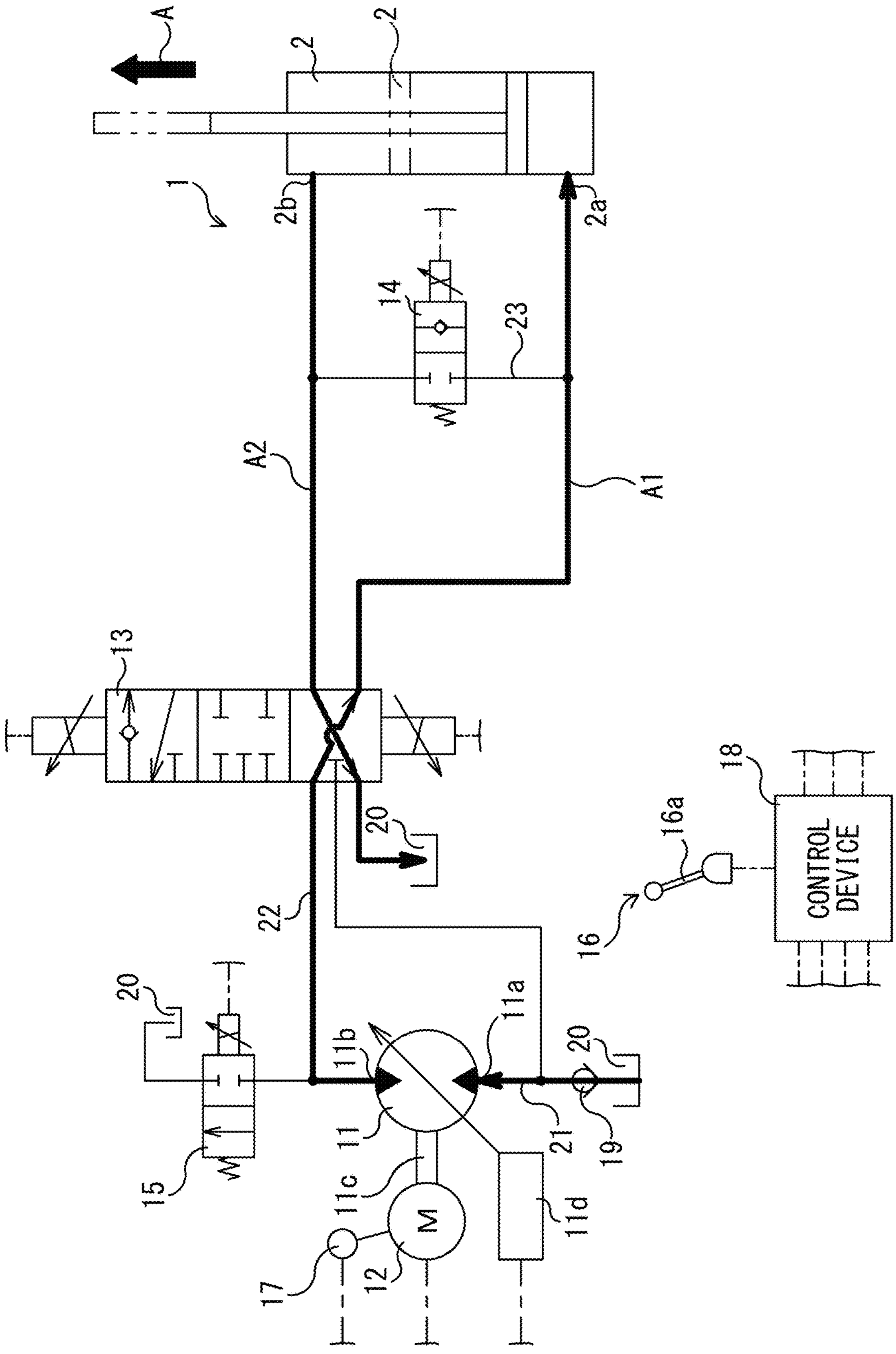
FIG. 2 is a circuit diagram illustrating the flow of a working fluid in the hydraulic drive device illustrated in FIG. 1, when a boom cylinder is extended.

The following describes, in a greater detail, the case where the boom cylinder 2 is extended and retracted. In the hydraulic drive device 1, when the operation device 16 is operated in order to extend the boom cylinder 2, the operation device 16 outputs the operation signal. As a result, the control device 18 operates the directional control valve 13 according to the operation signal. More specifically, the control device 18 outputs the operation command corresponding to the operation signal to the directional control valve 13. Accordingly, the directional control valve 13 connects the discharge port 11*b* to the head-end port 2*a* and connects the rod-end port 2*b* to the tank 20, as illustrated in FIG. 2. Meanwhile, the directional control valve 13 cuts off the suction port 11*a* from the head-end port 2*a* and the rod-end port 2*b*. Furthermore, the control device 18 outputs the rotational speed command and the capacity command that correspond to the operation signal. As a result, the hydraulic pump motor 11 discharges the working fluid from the discharge port 11*b* at a flow rate corresponding to the operation signal. The working fluid discharged is brought to the head-end port 2*a* via the directional control valve 13 (the arrow A1 in FIG. 2). Meanwhile, the working fluid is drained from the rod-end port 2*b* to the tank 20 via the directional control valve 13 (the arrow A2 in FIG. 2). As a result, the boom cylinder 2 is extended at a speed corresponding to the operation signal (refer to the arrow A and the dash-dot-dot line in FIG. 2). Thus, the boom can be raised at a speed corresponding to the operation signal.

[Operation to Retract Boom Cylinder]

Figure 3:
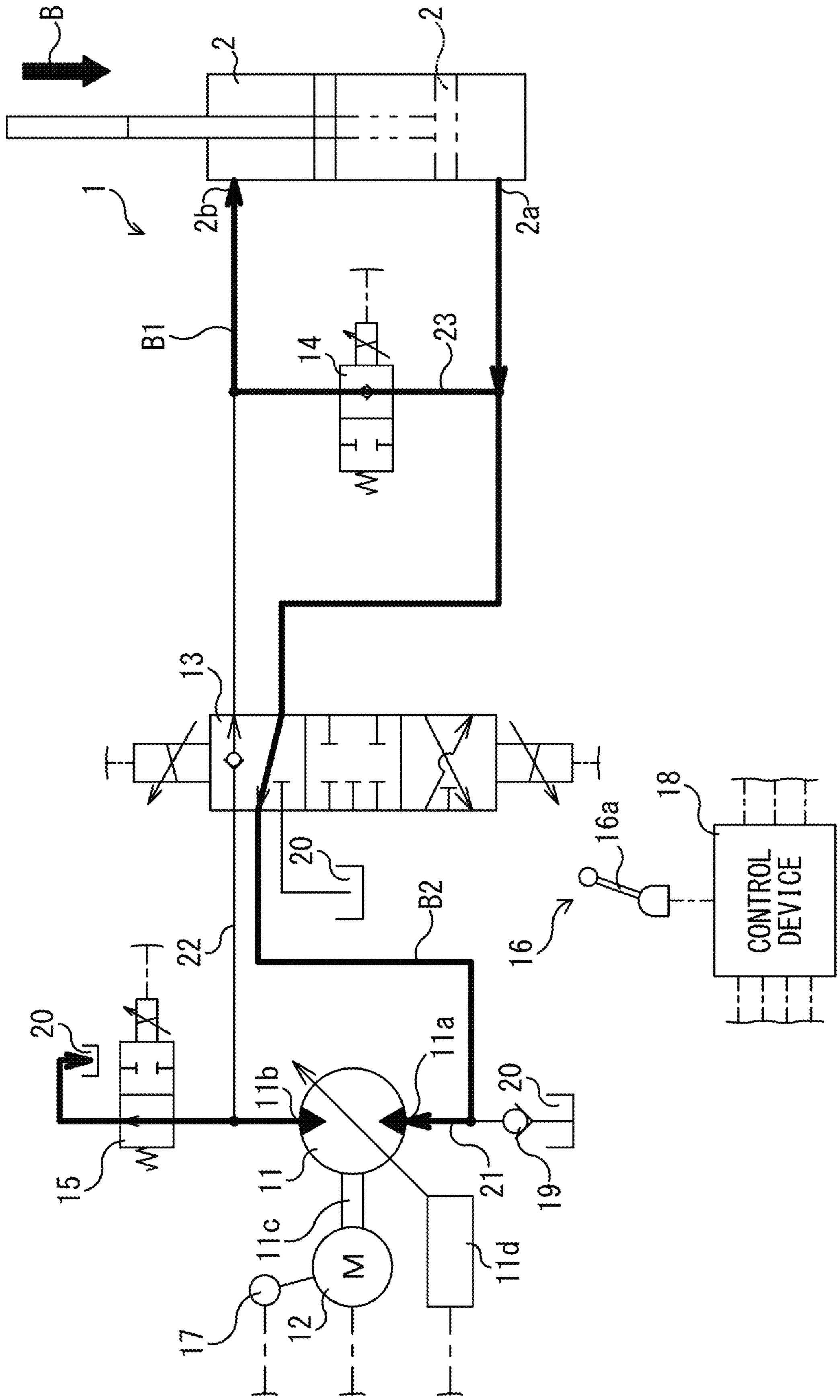
FIG. 3 is a circuit diagram illustrating the flow of a working fluid in the hydraulic drive device illustrated in FIG. 1, when a boom cylinder is retracted.

In the hydraulic drive device 1, when the operation device 16 is operated in order to retract the boom cylinder 2, the operation device 16 outputs the operation signal. As a result, the control device 18 operates the directional control valve 13, the regeneration valve 14, and the unloader valve 15 according to the operation signal. More specifically, the control device 18 outputs the operation command corresponding to the operation signal to the directional control valve 13. Accordingly, the control device 18 causes the directional control valve 13 to connect the head-end port 2*a* to the suction port 11*a*, as illustrated in FIG. 3. Furthermore, the control device 18 outputs the regeneration command to the regeneration valve 14. Accordingly, the control device 18 causes the regeneration valve 14 to open the regeneration passage 23. As a result, the head-end port 2*a* and the rod-end port 2*b* are placed in communication. Moreover, the control device 18 outputs the unloading command to the unloader valve 15. Accordingly, the control device 18 causes the unloader valve 15 to connect the discharge passage 22 to the tank 20. As a result, the hydraulic pump motor 11 is unloaded.

When the directional control valve 13, the regeneration valve 14, and the unloader valve 15 are operated as described above, the working fluid flows as follows. Specifically, the boom cylinder 2 is under the empty weight of the boom in the retracting direction. Therefore, the boom cylinder 2 is retracted under the empty weight of the boom. Thus, the working fluid is drained from the head-end port 2*a*. Part of the working fluid drained is supplied to the rod-end port 2*b* through the regeneration passage 23. In other words, part of the working fluid is regenerated from the head-end port 2*a* to the rod-end port 2*b* (refer to the arrow B1 in FIG. 3). Meanwhile, the remaining part is supplied to the suction port 11*a* of the hydraulic pump motor 11 via the directional control valve 13 (refer to the arrow B2 in FIG. 3). Subsequently, the remaining part rotatably drives the electric motor 12 via the hydraulic pump motor 11 and then is drained from the discharge port 11*b* to the tank 20 via the unloader valve 15. When the electric motor 12 is rotatably driven, the electric motor 12 generates electric power. As a result, the fluid energy of the remaining part is regenerated as electrical energy. In other words, the potential energy of the boom is regenerated as electrical energy. Thus, energy can be regenerated using the working fluid drained.

Furthermore, by controlling the suction flow rate at the hydraulic pump motor 11, the control device 18 retracts the boom cylinder 2 at a speed corresponding to the operation signal. More specifically, the control device 18 outputs the rotational speed command and the capacity command that correspond to the operation signal. Accordingly, the hydraulic pump motor 11 can cause the working fluid to flow into the suction port 11*a* at a flow rate corresponding to the operation signal; thus, the flow rate of the working fluid that is drained from the head-end port 2*a* of the boom cylinder 2 can be controlled and set to the flow rate corresponding to the operation signal. As a result, the flow rate of the working fluid that is regenerated to the rod-end port 2*b* can be controlled and set to the flow rate corresponding to the operation signal and therefore, the boom cylinder 2 can be retracted at a speed corresponding to the operation signal (refer to the arrow B and the dash-dot-dot line in FIG. 3). Thus, the boom can be lowered at a speed corresponding to the operation signal.

Furthermore, when a predetermined condition is satisfied, the control device 18 reduces the opening degree of the regeneration valve 14. Furthermore, when the predetermined condition is satisfied, the control device 18 causes the directional control valve 13 to reduce the opening degree between the head-end port 2*a* and the suction port 11*a*. In other words, when the predetermined condition is satisfied, the control device 18 reduces the opening degree of the directional control valve 13. In the predetermined embodiment, the predetermined condition is that the coil temperature of the electric motor 12 is higher than or equal to a predetermined temperature. This means that in order to prevent an excessive increase in the coil temperature of the electric motor 12, the control device 18 reduces the opening degree of the regeneration valve 14 and also causes the directional control valve 13 to reduce the opening degree between the head-end port 2*a* and the suction port 11*a*.

More specifically, the control device 18 estimates the coil temperature on the basis of the temperature of the casing measured by the temperature sensor 17. Subsequently, when causing the directional control valve 13 to connect the head-end port 2*a* to the suction port 11*a* (in other words, when retracting the boom cylinder 2), the control device 18 determines whether the coil temperature is higher than or equal to the predetermined temperature. When the coil temperature is lower than the predetermined temperature, the control device 18 sets the opening degree of the regeneration valve 14 to at least a predetermined regeneration opening degree, for example, a full opening degree. Furthermore, the control device 18 sets the opening degree between the head-end port 2*a* and the suction-end port 11*a* to at least a predetermined regeneration opening degree by the directional control valve 13, for example, a full opening degree. Note that each of the regeneration opening degree and the regeneration opening degree does not necessarily need to be the full opening degree; it is sufficient that each of the regeneration opening degree and the regeneration opening degree be at least 85% of the full opening degree. By placing the regeneration valve 14 and the directional control valve 13 in fully open states in this manner, it is possible to minimize the occurrence of pressure losses in the working fluid, meaning that more energy can be regenerated as electrical energy.

On the other hand, when the coil temperature is higher than or equal to the predetermined temperature, the control device 18 reduces the opening degree of the regeneration valve 14. More specifically, the control device 18 reduces the opening degree of the regeneration valve 14 from the predetermined regeneration opening degree. Specifically, the control device 18 reduces the opening degree of the regeneration valve 14 to an opening degree that is, for example, 50% or more and less than 85% of the opening degree in the fully open state. As a result, a pressure loss occurs in the working fluid flowing in the hydraulic drive device 1. Therefore, the fluid energy of the working fluid to be supplied to the hydraulic pump motor 11 can be reduced. Note that the reduced opening degree of the regeneration valve 14 is not limited to the aforementioned numerical range; it is sufficient that the reduced opening degree of the regeneration valve 14 be less than the predetermined regeneration opening degree.

Furthermore, the control device 18 also causes the directional control valve 13 to reduce the opening degree between the head-end port 2*a* and the suction-end port 11*a*. More specifically, the control device 18 causes the directional control valve 13 to reduce the opening degree between the head-end port 2*a* and the suction port 11*a* from the predetermined regeneration opening degree. For example, the control device 18 reduces the opening degree between the head-end port 2*a* and the suction port 11*a* to an opening degree that is, for example, 50% or more and less than 85% of the opening degree in the fully open state. As a result, it is possible to cause a pressure loss in the working fluid to be supplied to the hydraulic pump motor 11 while minimizing the reduction in the hydraulic pressure of the working fluid to be supplied to the rod-end port 2*b*. Therefore, the fluid energy of the working fluid to be supplied to the hydraulic pump motor 11 can be reduced. Note that the reduced opening degree between the head-end port 2*a* and the suction port 11*a* is not limited to the aforementioned numerical range; it is sufficient that the reduced opening degree between the head-end port 2*a* and the suction port 11*a* be less than the predetermined regeneration opening degree.

In this manner, in the hydraulic drive device 1, the fluid energy of the working fluid is reduced using the regeneration valve 14 and the directional control valve 13. This allows for a reduction in energy to be regenerated using the electric motor 12. Thus, it is possible to prevent an excessive increase in the coil temperature of the electric motor 12.

In the hydraulic drive device 1 according to the present embodiment, the directional control valve 13 connects the head-end port 2*a* and the suction port 11*a*, and the unloader valve 15 connects the discharge passage 22 and the tank 20. Therefore, when the boom cylinder 2 is retracted, the working fluid is pushed out through the head-end port 2*a* and supplied to the suction port 11*a* of the hydraulic pump motor 11. With this, the electric motor 12 can be driven via the hydraulic pump motor 11, meaning that energy can be regenerated using the electric motor 12. Thus, the energy consumption in the hydraulic drive device 1 can be reduced.

Furthermore, in the hydraulic drive device 1, the regeneration valve 14 opens and closes the regeneration passage 23 connecting the head-end port 2*a* and the rod-end port 2*b*. Therefore, the regeneration valve 14 is opened when the working fluid is pushed out through the head-end port 2*a*, and thus part of the working fluid pushed out is regenerated to the rod-end port 2*b*. Thus, the working fluid can be quickly supplied to the rod-end port 2*b*, allowing for improved operability.

Furthermore, in the hydraulic drive device 1 according to the present embodiment, the control device 18 controls the operation of each of the directional control valve 13, the regeneration valve 14, and the unloader valve 15 according to the operation signal that is input to the control device 18. Thus, the control device 18 can electrically control the directional control valve 13, the regeneration valve 14, and the unloader valve 15.

Furthermore, in the hydraulic drive device 1 according to the present embodiment, the unloader valve 15 connects the discharge passage 22 to the tank 20 when energy is regenerated using the electric motor 12. This makes it possible to reduce the increase in discharge pressure at the hydraulic pump motor 11. Therefore, the regeneration efficiency in the electric motor 12 can be improved.

Furthermore, in the hydraulic drive device 1 according to the present embodiment, it is possible to cause a pressure loss in the working fluid by reducing the opening degree of the regeneration valve 14 when the predetermined condition is satisfied. This allows for a reduction in energy to be regenerated using the electric motor 12 when energy is regenerated using the electric motor 12. Thus, the load on the electric motor 12 can be reduced.

Furthermore, in the hydraulic drive device 1 according to the present embodiment, it is possible to cause a pressure loss in the working fluid by reducing the opening degree between the head-end port 2*a* and the suction port 11*a* when the predetermined condition is satisfied. This allows for a reduction in energy to be regenerated using the electric motor 12 when energy is regenerated using the electric motor 12. Thus, the load on the electric motor 12 can be reduced.

Furthermore, in the hydraulic drive device 1 according to the present embodiment, the predetermined condition is that the coil temperature is higher than or equal to the predetermined temperature. Therefore, in energy regeneration using the electric motor 12, when the coil temperature is higher than or equal to the predetermined temperature, energy to be regenerated using the electric motor 12 can be reduced. Thus, it is possible to prevent an excessive increase in the coil temperature of the electric motor 12.

Embodiment 2

A hydraulic drive device 1A according to Embodiment 2 is similar in configuration to the hydraulic drive device 1 according to Embodiment 1. Therefore, the configuration of the hydraulic drive device 1A according to Embodiment 2 will be described focusing on differences from the hydraulic drive device 1 according to Embodiment 1; elements that are the same as those of the hydraulic drive device 1 according to Embodiment 1 share the same reference signs, and as such, description of the elements will be omitted.

Figure 4:
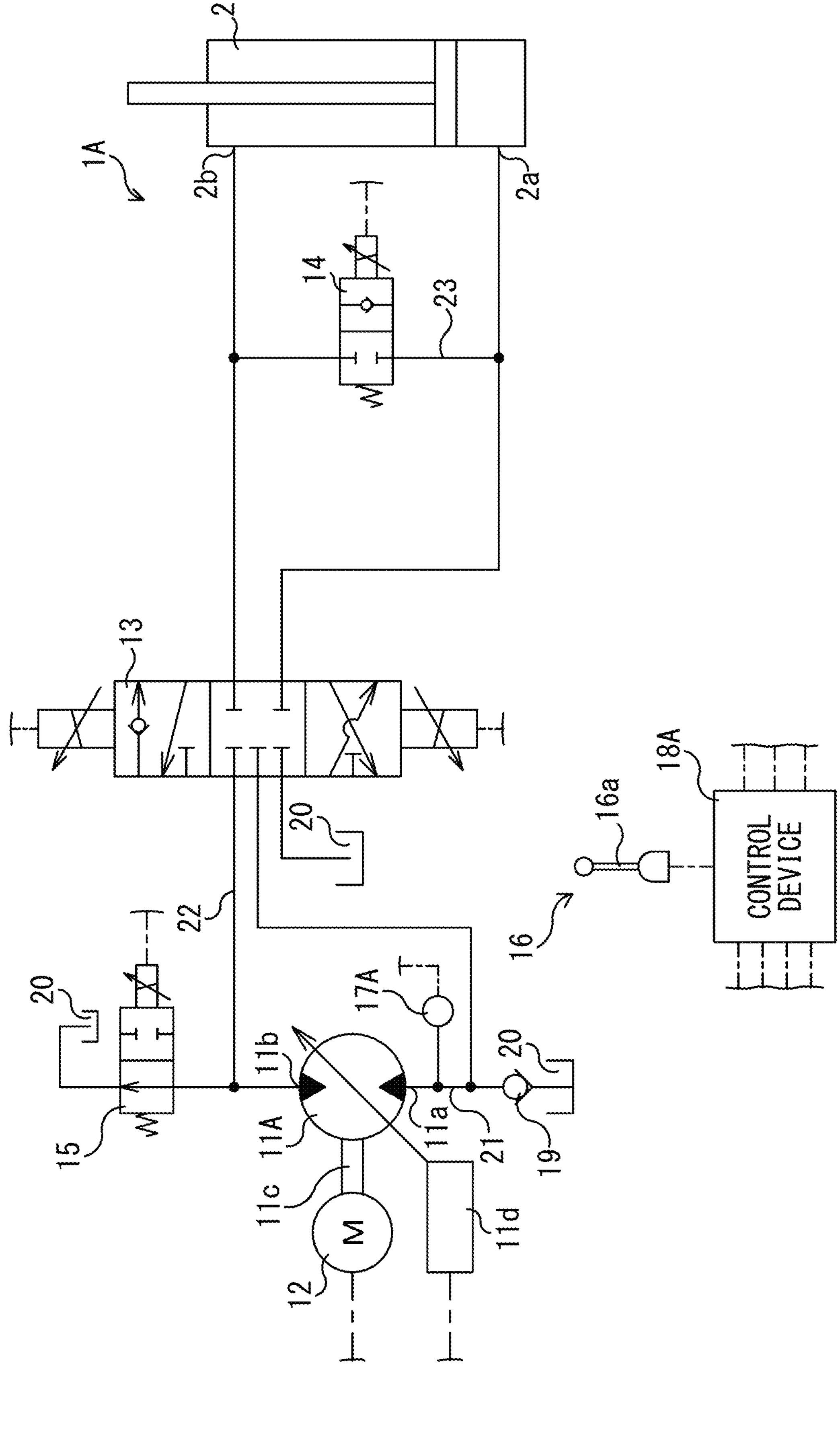
FIG. 4 is a circuit diagram illustrating the configuration of a hydraulic drive device according to Embodiment 2 of the present disclosure.

The hydraulic drive device 1A according to Embodiment 2, which is illustrated in FIG. 4, includes a hydraulic pump motor 11A, the electric motor 12, the directional control valve 13, the regeneration valve 14, and the unloader valve 15. Furthermore, the hydraulic drive device 1A includes the operation device 16, a suction-end pressure sensor 17A, and a control device 18A.

<Suction-End Pressure Sensor>

The suction-end pressure sensor 17A measures inflow pressure at the hydraulic pump motor 11A. The inflow pressure, which is also referred to as suction pressure, is the pressure of the working fluid flowing into the suction port 11*a* of the hydraulic pump motor 11A. More specifically, the suction-end pressure sensor 17A is connected to the suction passage 21. The suction-end pressure sensor 17A measures hydraulic pressure in the suction passage 21 as the inflow pressure. Subsequently, the suction-end pressure sensor 17A outputs the measured inflow pressure.

<Control Device>

The control device 18A controls the operation of each of the directional control valve 13, the regeneration valve 14, and the unloader valve 15 according to an operation signal that is input to the control device 18A, as with the control device 18 according to Embodiment 1. Furthermore, the control device 18A controls the operation of each of the directional control valve 13 and the regeneration valve 14 on the basis of the inflow pressure measured by the suction-end pressure sensor 17A.

<Operation of Hydraulic Drive Device>

In the hydraulic drive device 1A, when the operation device 16 is operated (in the present embodiment, when the operation lever 16*a* is operated), the operation device 16 outputs the operation signal. Similar to the control device 18 according to Embodiment 1, the control device 18A also controls the operation of each of the directional control valve 13, the regeneration valve 14, and the unloader valve 15 according to the operation signal. Accordingly, the boom cylinder 2 is extended and retracted in directions corresponding to the operation directions at speeds corresponding to the operation amounts.

Furthermore, when a predetermined condition is satisfied, the control device 18A reduces the opening degree of the regeneration valve 14 and causes the directional control valve 13 to reduce the opening degree between the head-end port 2*a* and the suction port 11*a*. In the present embodiment, the predetermined condition is that the inflow load on the hydraulic pump motor 11A is greater than or equal to a predetermined value. This means that in order to prevent an excessive increase in the inflow load on the hydraulic pump motor 11A, the control device 18A reduces the opening degree of the regeneration valve 14 and also causes the directional control valve 13 to reduce the opening degree between the head-end port 2*a* and the suction port 11*a*.

More specifically, the control device 18A calculates the inflow load on the hydraulic pump motor 11A on the basis of the inflow pressure measured by the suction-end pressure sensor 17A. In the present embodiment, the control device 18A calculates the inflow load on the basis of a capacity command (specifically, the pump capacity of the hydraulic pump motor 11A) and a rotational speed command (specifically, the rotational speed of the electric motor 12) in addition to the inflow pressure. Subsequently, when causing the directional control valve 13 to connect the head-end port 2*a* to the suction port 11*a* (in other words, when retracting the boom cylinder 2), the control device 18A determines whether the inflow load is greater than or equal to the predetermined value.

When the inflow load is less than the predetermined value, the control device 18A sets the opening degree of the regeneration valve 14 to at least the predetermined regeneration opening degree. Furthermore, the control device 18A sets the opening degree between the head-end port 2*a* and the suction-end port 11*a* to at least the predetermined regeneration opening degree by using the directional control valve 13. By setting the regeneration valve 14 and the directional control valve 13 to have the predetermined regeneration opening degree and the predetermined regeneration opening degree, respectively, in this manner, it is possible to minimize the occurrence of pressure losses in the working fluid, meaning that more energy can be regenerated as electrical energy.

On the other hand, when the inflow load is greater than or equal to the predetermined value, the control device 18A reduces the opening degree of the regeneration valve 14. More specifically, the control device 18A reduces the opening degree of the regeneration valve 14 from the predetermined regeneration opening degree. As a result, a pressure loss occurs in the working fluid flowing in the hydraulic drive device 1A. Therefore, the fluid energy of the working fluid can be reduced. Furthermore, the control device 18A also causes the directional control valve 13 to reduce the opening degree between the head-end port 2*a* and the suction-end port 11*a*. More specifically, the control device 18A reduces the opening degree between the head-end port 2*a* and the suction port 11*a* from the predetermined regeneration opening degree. As a result, it is possible to cause a pressure loss in the working fluid to be supplied to the hydraulic pump motor 11A while minimizing the reduction in the hydraulic pressure of the working fluid to be supplied to the rod-end port 2*b*. Therefore, the fluid energy of the working fluid to be supplied to the hydraulic pump motor 11A can be reduced. By reducing the fluid energy of the working fluid in this manner, it is possible to reduce energy to be regenerated using the electric motor 12. Thus, it is possible to prevent an excessive increase in the inflow load on the electric motor 12.

In the hydraulic drive device 1A according to the present embodiment, the predetermined condition is that the inflow load is greater than or equal to the predetermined value. Therefore, in energy regeneration using the electric motor 12, when the inflow load is greater than or equal to the predetermined value, energy to be regenerated using the electric motor 12 can be reduced. Thus, it is possible to prevent an excessive increase in the inflow load on the electric motor 12.

The hydraulic drive device 1A according to the present embodiment produces substantially the same advantageous effects as those produced by the hydraulic drive device 1 according to Embodiment 1.

Other Embodiments

In the hydraulic drive devices 1, 1A according to the present embodiments, the hydraulic cylinder that supplies the working fluid may be hydraulic cylinders other than the boom cylinder 2 such as an arm cylinder and a lift cylinder, for example. The directional control valve 13 and the regeneration valve 14 do not necessarily need to both have adjustable opening degrees; it is sufficient that at least one of the directional control valve 13 and the regeneration valve 14 be configured so that the opening degree thereof can be adjusted. When the predetermined condition is satisfied, the control devices 18, 18A do not necessarily need to reduce the opening degrees of both of the directional control valve 13 and the regeneration valve 14. It is sufficient that the control devices 18, 18A reduce the opening degree of at least one of the directional control valve 13 and the regeneration valve 14. Furthermore, the control devices 18, 18A may selectively reduce the opening degrees of the directional control valve 13 and the regeneration valve 14 according to the coil temperature or the inflow load. For example, according to an increase in the coil temperature, the control devices 18, 18A first reduce the opening degree of the regeneration valve 14, and then reduce the opening degree of the directional control valve 13. The target in the predetermined condition is not limited to the coil temperature and the inflow load. The drive source for the hydraulic pump motors 11, 11A is not limited to the electric motor 12 and may be a hybrid drive source that uses the electric motor 12 and an engine.

Exemplary Embodiments

A hydraulic drive device according to the first aspect supplies a working fluid to a hydraulic cylinder including a head-end port and a rod-end port and includes: a hydraulic pump motor including a suction port and a discharge port; an electric motor connected to the hydraulic pump motor; a directional control valve that switches a connection target of the head-end port between the discharge port and the suction port; a regeneration valve that opens and closes a regeneration passage connecting the head-end port and the rod-end port; and an unloader valve that connects, to a tank, a discharge passage connecting the discharge port and the directional control valve.

According to this aspect, the directional control valve connects the head-end port and the suction portion, and the unloader valve connects the discharge passage and the tank. Therefore, when the hydraulic cylinder is retracted, the working fluid is pushed out through the head-end port and supplied to the suction port of the hydraulic pump motor. With this, the electric motor can be driven via the hydraulic pump motor, meaning that energy can be regenerated using the electric motor. Thus, the energy consumption in the hydraulic drive device can be reduced.

Furthermore, according to this aspect, the regeneration valve opens and closes the regeneration passage connecting the head-end port and the rod-end port. The regeneration valve is opened when the working fluid is pushed out through the head-end port, and thus part of the working fluid pushed out is regenerated to the rod-end port. Thus, the working fluid can be quickly supplied to the rod-end port, allowing for improved operability.

As a hydraulic drive device according to the second aspect, the hydraulic drive device according to the first aspect may further include a control device that controls an operation of each of the directional control valve, the regeneration valve, and the unloader valve according to a signal that is input to the control valve.

According to this aspect, the control device controls the operation of each of the directional control valve, the regeneration valve, and the unloader valve according to the signal that is input to the control device. Therefore, the control device can electrically control the directional control valve, the regeneration valve, and the unloader valve.

As a hydraulic drive device according to the third aspect, in the hydraulic drive device according to the second aspect, in causing the directional control valve to connect the head-end port to the suction port, the control device may cause the unloader valve to connect the discharge passage to the tank.

According to this aspect, the unloader valve connects the discharge passage to the tank when energy is regenerated using the electric motor. This makes it possible to reduce the increase in discharge pressure at the hydraulic pump motor. Therefore, the regeneration efficiency in the electric motor can be improved.

As a hydraulic drive device according to the fourth aspect, in the hydraulic drive device according to the second or third aspect, in causing the directional control valve to connect the head-end port to the suction port, the control device may cause the regeneration valve to open the regeneration passage and when a predetermined condition is satisfied, reduce an opening degree of the regeneration valve.

According to this aspect, it is possible to cause a pressure loss in the working fluid by reducing the opening degree of the regeneration valve when the predetermined condition is satisfied. This allows for a reduction in energy to be regenerated using the electric motor when energy is regenerated using the electric motor. Thus, the load on the electric motor can be reduced.

As a hydraulic drive device according to the fifth aspect, in the hydraulic drive device according to any one of the second to fourth aspect, in causing the directional control valve to connect the head-end port to the suction port, when a predetermined condition is satisfied, the control device may cause the directional control valve to reduce an opening degree between the head-end port and the suction port.

According to this aspect, it is possible to cause a pressure loss in the working fluid by reducing the opening degree between the head-end port and the suction port when the predetermined condition is satisfied. This allows for a reduction in energy to be regenerated using the electric motor when energy is regenerated using the electric motor. Thus, the load on the electric motor can be reduced.

As a hydraulic drive device according to the sixth aspect, the hydraulic drive device according to the fourth or fifth aspect may further include a temperature sensor that measures a coil temperature of the electric motor, and the predetermined condition may be that the coil temperature measured by the temperature sensor is higher than or equal to a predetermined temperature.

According to this aspect, the predetermined condition is that the coil temperature is higher than or equal to the predetermined temperature. Therefore, in energy regeneration using the electric motor, when the coil temperature is higher than or equal to the predetermined temperature, energy to be regenerated using the electric motor can be reduced. Thus, it is possible to prevent an excessive increase in the coil temperature of the electric motor.

As a hydraulic drive device according to the seventh aspect, the hydraulic drive device according to the fourth or fifth aspect may further include a suction-end pressure sensor that measures inflow pressure that is hydraulic pressure at the suction port of the hydraulic pump motor, the control device may calculate an inflow load on the hydraulic pump motor according to the inflow pressure measured by the suction-end pressure sensor, and the predetermined condition may be that the inflow load is greater than or equal to a predetermined value.

According to this aspect, the predetermined condition is that the inflow load is greater than or equal to the predetermined value. Therefore, in energy regeneration using the electric motor, when the inflow load is greater than or equal to the predetermined value, energy to be regenerated using the electric motor can be reduced. Thus, it is possible to prevent an excessive increase in the inflow load on the electric motor.

From the foregoing description, many modifications and other embodiments of the present invention would be obvious to a person having ordinary skill in the art. Therefore, the foregoing description should be interpreted only as an example and is provided for the purpose of teaching the best mode for carrying out the present invention to a person having ordinary skill in the art. Substantial changes in details of the structures and/or functions of the present invention are possible within the spirit of the present invention.

The invention claimed is:

1. A hydraulic drive device that supplies a working fluid to a hydraulic cylinder including a head-end port and a rod-end port, the hydraulic drive device comprising:

a hydraulic pump motor including a suction port and a discharge port;

an electric motor connected to the hydraulic pump motor;

a directional control valve that switches a connection target of the head-end port between the discharge port and the suction port;

a regeneration valve that opens and closes a regeneration passage connecting the head-end port and the rod-end port;

an unloader valve that connects, to a tank, a discharge passage connecting the discharge port and the directional control valve; and a control device that controls an operation of each of the directional control valve, the regeneration valve, and the unloader valve according to a signal that is input to the control device, wherein in causing the directional control valve to connect the head-end port to the suction port, the control device causes the unloader valve to connect the discharge passage to the tank.

2. A hydraulic drive device that supplies a working fluid to a hydraulic cylinder including a head-end port and a rod-end port, the hydraulic drive device comprising:

a hydraulic pump motor including a suction port and a discharge port;

an electric motor connected to the hydraulic pump motor;

a directional control valve that switches a connection target of the head-end port between the discharge port and the suction port;

a regeneration valve that opens and closes a regeneration passage connecting the head-end port and the rod-end port;

an unloader valve that connects, to a tank, a discharge passage connecting the discharge port and the directional control valve; and a control device that controls an operation of each of the directional control valve, the regeneration valve, and the unloader valve according to a signal that is input to the control device, wherein in causing the directional control valve to connect the head-end port to the suction port, the control device causes the regeneration valve to open the regeneration passage and when a predetermined condition is satisfied, reduces an opening degree of the regeneration valve.

3. The hydraulic drive device according to claim 2, further comprising:

a temperature sensor that measures a coil temperature of the electric motor, wherein the predetermined condition is that the coil temperature measured by the temperature sensor is higher than or equal to a predetermined temperature.

4. The hydraulic drive device according to claim 2, further comprising:

a suction-end pressure sensor that measures inflow pressure that is hydraulic pressure at the suction port of the hydraulic pump motor, wherein the control device calculates an inflow load on the hydraulic pump motor according to the inflow pressure measured by the suction-end pressure sensor, and the predetermined condition is that the inflow load is greater than or equal to a predetermined value.

5. A hydraulic drive device that supplies a working fluid to a hydraulic cylinder including a head-end port and a rod-end port, the hydraulic drive device comprising:

a hydraulic pump motor including a suction port and a discharge port;

an electric motor connected to the hydraulic pump motor;

a directional control valve that switches a connection target of the head-end port between the discharge port and the suction port;

a regeneration valve that opens and closes a regeneration passage connecting the head-end port and the rod-end port;

an unloader valve that connects, to a tank, a discharge passage connecting the discharge port and the directional control valve; and a control device that controls an operation of each of the directional control valve, the regeneration valve, and the unloader valve according to a signal that is input to the control device, wherein in causing the directional control valve to connect the head-end port to the suction port, when a predetermined condition is satisfied, the control device causes the directional control valve to reduce an opening degree between the head-end port and the suction port.

6. The hydraulic drive device according to claim 5, further comprising:

a temperature sensor that measures a coil temperature of the electric motor, wherein the predetermined condition is that the coil temperature measured by the temperature sensor is higher than or equal to a predetermined temperature.

7. The hydraulic drive device according to claim 5, further comprising:

a suction-end pressure sensor that measures inflow pressure that is hydraulic pressure at the suction port of the hydraulic pump motor, wherein the control device calculates an inflow load on the hydraulic pump motor according to the inflow pressure measured by the suction-end pressure sensor, and the predetermined condition is that the inflow load is greater than or equal to a predetermined value.

* * * * *